United States Patent
Erickson

(10) Patent No.: US 8,475,093 B2
(45) Date of Patent: Jul. 2, 2013

(54) CLAMPING UNIT WITH CANISTER SLEEVE RETENTION DEVICE

(75) Inventors: Robert Alfred Erickson, Raleigh, NC (US); Carla Erickson, legal representative, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 866 days.

(21) Appl. No.: 12/640,824

(22) Filed: Dec. 17, 2009

(65) Prior Publication Data

US 2011/0150593 A1    Jun. 23, 2011

(51) Int. Cl.
*B23B 31/107*    (2006.01)
(52) U.S. Cl.
USPC ............ 409/231; 82/160; 279/2.12; 279/2.23
(58) Field of Classification Search
CPC ...................................................... B23B 31/107
USPC ................. 279/2.11, 2.12, 2.1, 2.23; 82/158, 82/160, 161; 409/231–233; 403/362; 411/392, 411/393
See application file for complete search history.

(56) References Cited

U.S. PATENT DOCUMENTS

| | | | |
|---|---|---|---|
| 1,958,817 A * | 5/1934 | Gase | 279/83 |
| 2,171,163 A * | 8/1939 | Moore et al. | 411/368 |
| 4,135,418 A | 1/1979 | McCray et al. | |
| 4,863,323 A * | 9/1989 | Glaser | 409/232 |
| 5,415,066 A * | 5/1995 | Erickson et al. | 82/160 |
| 5,870,935 A | 2/1999 | Erickson et al. | |
| 6,196,094 B1 | 3/2001 | Erickson | |
| 7,610,834 B2 | 11/2009 | Erickson | |

* cited by examiner

*Primary Examiner* — Daniel Howell
*Assistant Examiner* — Ryan Rufo
(74) *Attorney, Agent, or Firm* — Larry R. Meenan, Esq.

(57) ABSTRACT

A clamping unit for releasably holding a tubular toolholder shank has a base member with a canister sleeve mounted therein. To secure the canister sleeve within the base member and to minimize movement caused by tolerances, retention bolts are threadably mated within the base member to engage a slot within the canister, wherein the relationship between the retention bolt and the slot is such that the retention bolt is intentionally misaligned, so that when engaged with the canister slot, the retention blot resiliently deflects and provides both an axial force and a lateral force upon a canister sleeve.

13 Claims, 6 Drawing Sheets

CLAMPING UNIT WITH CANISTER SLEEVE RETENTION DEVICE

BACKGROUND OF THE INVENTION

1. Field of the Invention

The present invention relates to clamping units used with toolholders in the metal working industry. In particular, the subject invention is directed to a retention device for securing a canister within the body of such a clamping unit.

2. Description of Related Art

FIGS. 1-3 illustrate prior art and, in particular, illustrate a clamping unit 10 for releasably holding a tubular shank 20 of a toolholder 25. The clamping unit 10 has a base member 30 with a longitudinal axis 32 extending therethrough and a forwardly facing exterior surface 34. A bore 36 extends inwardly from the forwardly facing exterior surface 34 for receiving the toolholder shank 20. A lock rod 38 is movable within the base member 30 along the longitudinal axis 32 in a forward and rearward reciprocating motion, wherein the lock rod 38 has at least one longitudinally extending depression 40 and an adjacent ramp 42, such that, in the rearward position (FIG. 1), locking balls 44 are radially displaced by the ramp 42 to engage the toolholder shank 20 within the base member 30 and, in the forward position (FIG. 2), the locking balls 44 retract into the depression 40 and release the shank 20 from the base member 30.

It should be noted that FIGS. 1 and 2 represent an arrangement, wherein the canister sleeve 50 is at least partially secured by a flange 51 secured within the front of the base member 30, while the canister sleeve 50 in FIG. 3 is secured by retention bolts 70. The base member 30 in FIGS. 1 and 2 and the base member 30 in FIG. 3 are different in this respect, but are both adequate to illustrate the prior art.

A canister sleeve 50 (FIG. 3) is mounted within the base member bore 36 and the sleeve outer surface 52 is adjacent to the bore 36 and the sleeve inner surface 54 surrounds at least a portion of the lock rod 38. The canister sleeve 50 has radial apertures 56 for guiding the locking ball 44 between the lock rod 38 and the tubular toolholder shank 20.

A shoulder 58 extends inwardly within the base member bore 36 and the canister sleeve 50 abuts with a stop ring 59, which abuts with the shoulder 58 to limit the rearward motion of the canister sleeve 50. FIG. 3 illustrates a stop ring 59 adjacent to the shoulder 58, however, the canister sleeve 50 may abut directly against the shoulder 58.

In part, the alignment and the stability of the toolholder 25 secured within the clamping unit 10 depends upon the orientation and the rigidity of the canister sleeve 50 within the base member 30. While FIGS. 1 and 2 illustrate a canister sleeve 50 that may be loaded from the rear of the clamping unit 10, FIG. 3 illustrates an arrangement whereby the canister sleeve 50 must be loaded from the front of the clamping unit 10 and it is upon this configuration in which the subject invention is based.

In the past, a retention bore 60 extended through the base member 30 along a retention bore axis 62, wherein the retention bore axis 62 had an axial component, indicated by arrow 64, extending into the base member bore 36. Additionally, the canister sleeve 50 had a slot 66, wherein the slot 66 had a locating surface 68 generally perpendicular to the retention bore axis 62. A retention bolt 70 was threadably mated with the retention bore 60 to contact the canister slot locating surface 68 and clamp the canister sleeve 50 within the base member bore 36.

However, there are clearances between the retention bolt 70 and the retention bore 60 which can lead to flexibility of the canister sleeve 50 mounted within the bore 36. In particular, with respect to FIG. 3, a gap 72 between the retention bolt 70 and the retention bore 60 illustrates such a clearance.

A design is needed to secure the canister sleeve 50 within the bore 36 of the base member 30 with a higher level of rigidity.

SUMMARY OF THE INVENTION

In one embodiment of the subject invention, a clamping unit for releasably holding a tubular shank of a toolholder has a base member with a longitudinal axis extending therethrough, a forwardly facing exterior surface, and a bore extending inwardly from the forwardly facing surface for receiving the toolholder shank. The clamping unit also has a lock rod movable within the base member along the longitudinal axis in a forward and rearward reciprocating motion. The lock rod has at least one longitudinally extending depression and an adjacent ramp, such that, in the rearward position, locking balls are radially displaced by the ramp to engage the toolholder shank within the base member and, in the forward position, the locking balls retract into the depression and release the shank from the base member. A canister sleeve is mounted within the base member bore with the sleeve outer surface adjacent to the bore wall and the sleeve inner surface surrounding at least a portion of the lock rod. The canister sleeve has radial apertures for guiding the locking balls between the lock rod and the tubular toolholder shank. A shoulder extends inwardly within the base member bore, wherein the canister sleeve abuts with the shoulder or with a stop ring adjacent to the shoulder to limit rearward motion of the canister sleeve. A retention bore extends through the base member along a retention bore axis having an axial component extending into the base member bore. A slot within the canister sleeve has a locating surface generally perpendicular to the retention bore axis and has a deflecting surface. The deflecting surface forms a positive angle X with respect to the retention bore axis. A retention bolt is threadably mated within the retention bore to contact the canister slot surfaces and clamp the canister sleeve within the base member bore. The retention bolt contacts the locating surface and contacts and is deflected by the deflecting surface in a radial outwardly direction, thereby applying a radially inward and axially rearward force to the canister sleeve.

In a second embodiment, the slot within the canister sleeve has a deflecting surface and together with an opposing portion of the retention bore wall forms a narrowing taper in a rearward direction of an angle Y. A retention bolt is threadably mated within the retention bore to contact the canister slot deflecting surface within the base member bore. The retention bolt acts as a wedge to secure the canister sleeve within the base member.

DESCRIPTION OF THE PREFERRED EMBODIMENT(S)

Figures 1, 2:
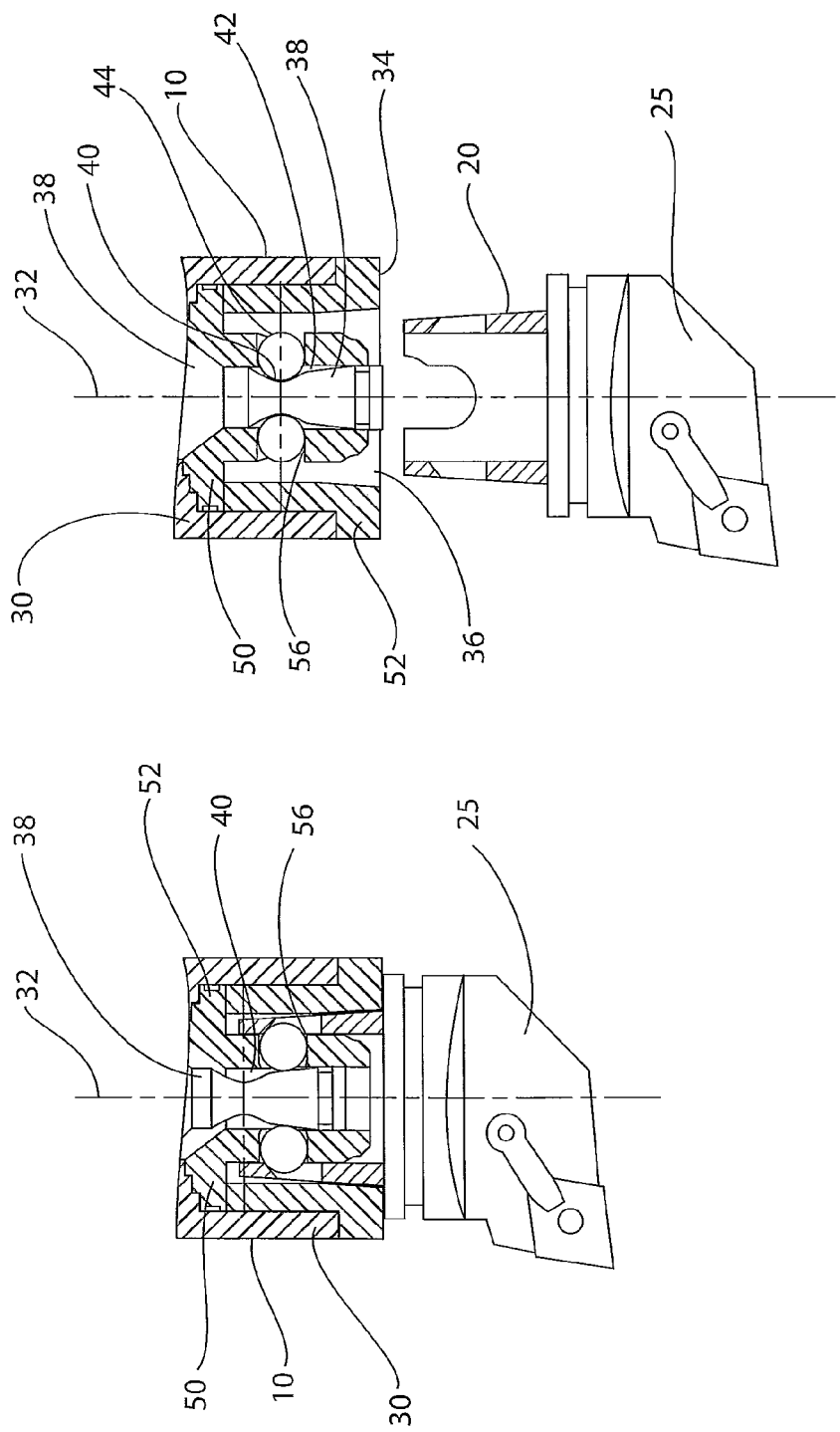
FIGS. 1 and 2 are prior art and illustrate cross-sectional views of a toolholder secured within a clamping unit and a toolholder ejected from a clamping unit, respectively.
Figure 3:
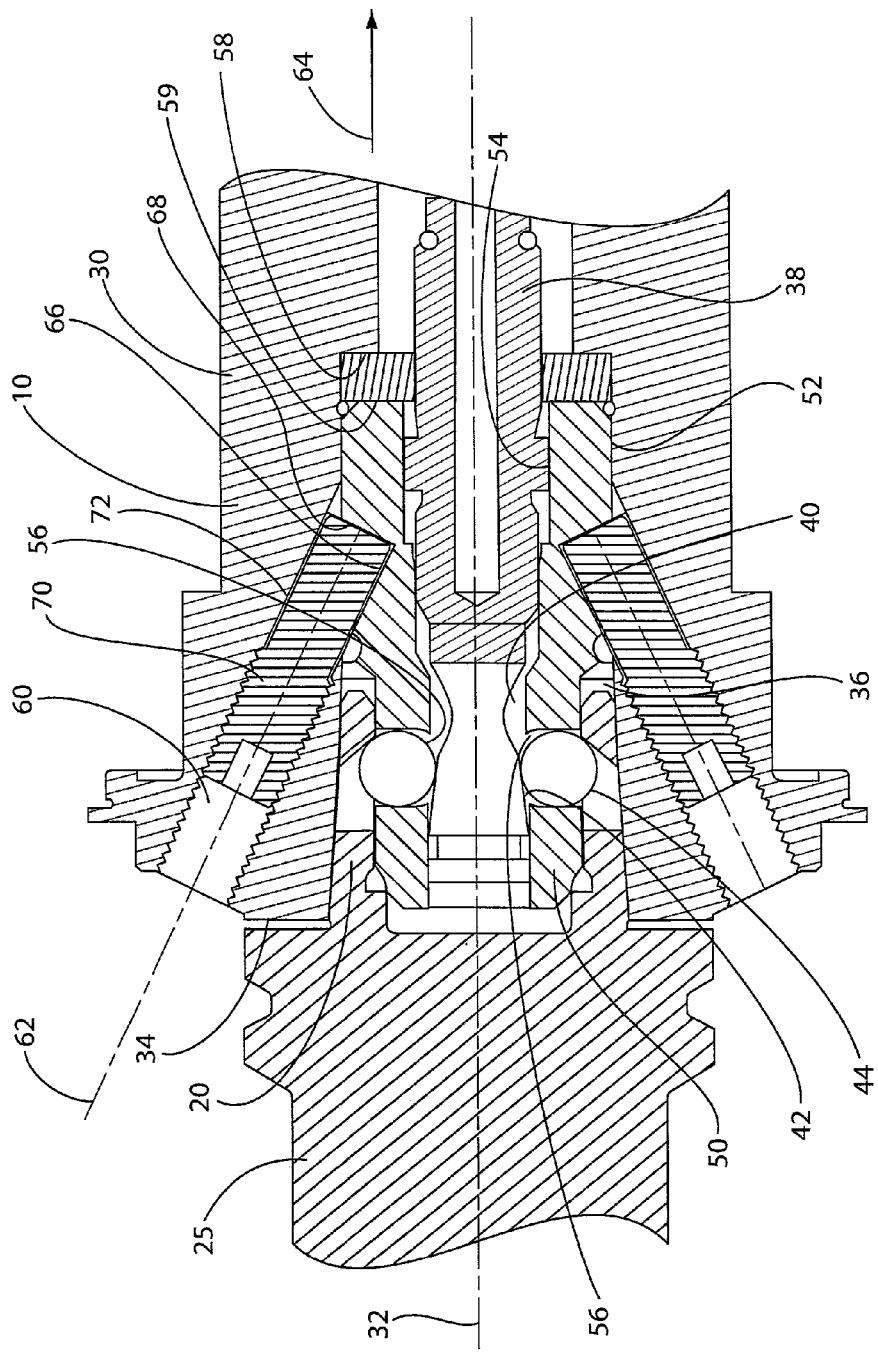
FIG. 3 is prior art and illustrates a cross-sectional view of a toolholder and clamping unit highlighting the retention screws used to secure the canister sleeve within the clamping unit.
Figure 4:
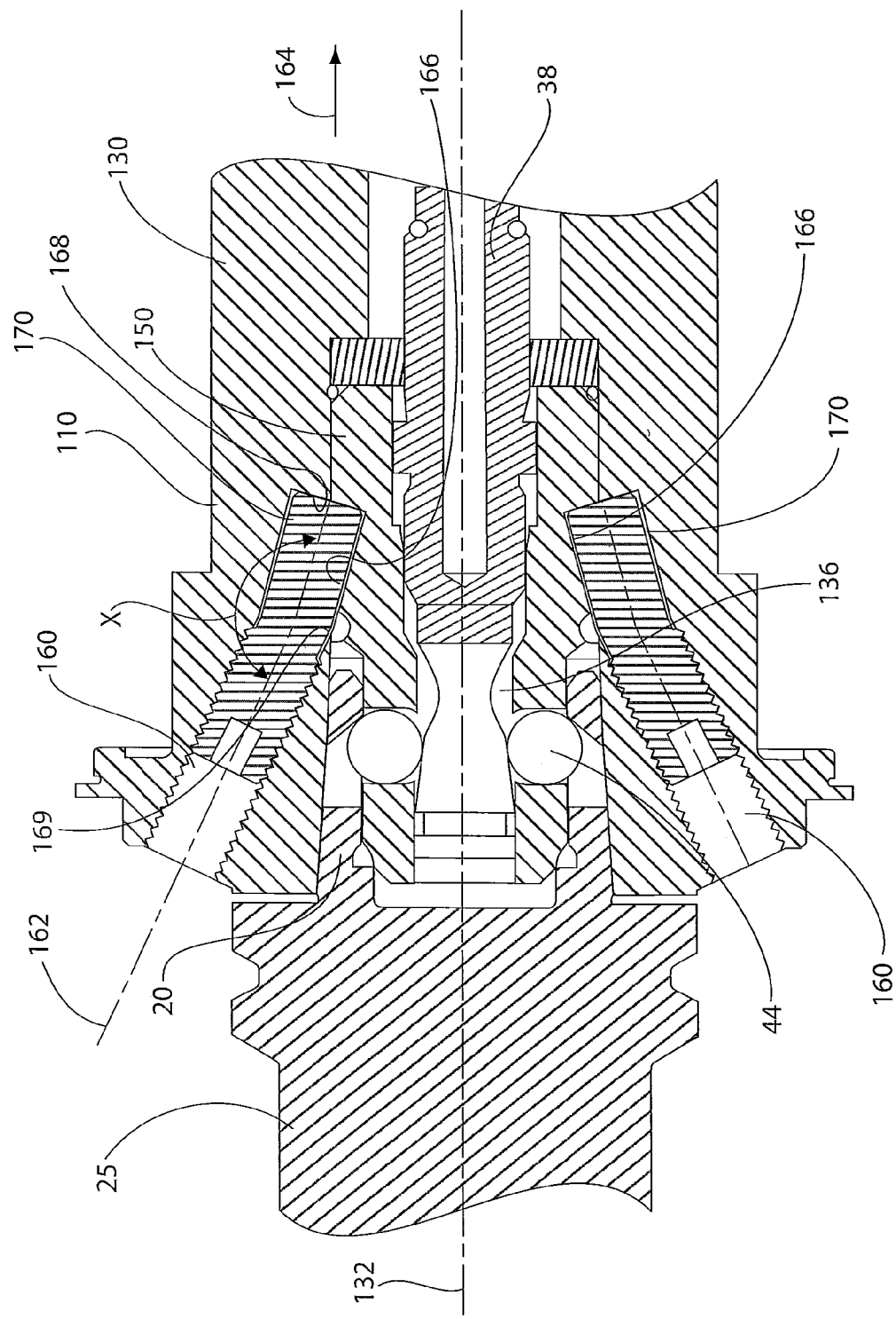
FIG. 4 illustrates a cross-sectional view similar to that illustrated in FIG. 3, however, is modified to show one embodiment of the subject invention.

Directing attention to FIG. 4, the common elements are identified with identical reference numerals to those found in FIGS. 1-3. FIG. 4 illustrates a clamping unit 110 for releasably holding a tubular shank 20 of a toolholder 25. The manner by which the locking balls 44 act in conjunction with the lock rod 38 to secure the shank 20 of the toolholder 25 within the clamping unit 110 is the same as that previously described with respect to FIGS. 1-3. However, the manner by which the canister sleeve 150 is secured within the base member 130 differs.

In particular, the base member 130 extends along a longitudinal axis 132 and has a retention bore 160 extending through the base member 130 along a retention bore axis 162, wherein the retention bore axis 162 has an axial component 164 extending into the base member bore 136.

The canister sleeve 150 has a slot 166, wherein the slot 166 has a locating surface 168 generally perpendicular to the retention bore axis 162 and has a deflecting surface 169. The deflecting surface 169 forms a positive angle X with respect to the retention bore axis 162. The angle X may be between 150 and 175 degrees and is preferably approximately 165 degrees.

A retention bolt 170 is threadably mated within the retention bore 160 to contact the canister slot surfaces 168, 169 and to clamp the canister sleeve 150 within the base member bore 136. In this fashion, the retention bolt 170 contacts the locating surface 168 and contacts and is deflected by the deflecting surface 169 in a radial outwardly direction, thereby applying a radially inward and axially rearward force to the canister sleeve 150. It should be appreciated that the resilient deflection of the retention bolt 170 eliminates any gap by forcing the retention bolt 170 to directly contact the retention bore 160. The portion of the retention bolt 170 adjacent to the deflecting surface 169 may not be threadingly engaged with the retention bore 160 to permit deflection.

Figure 5:
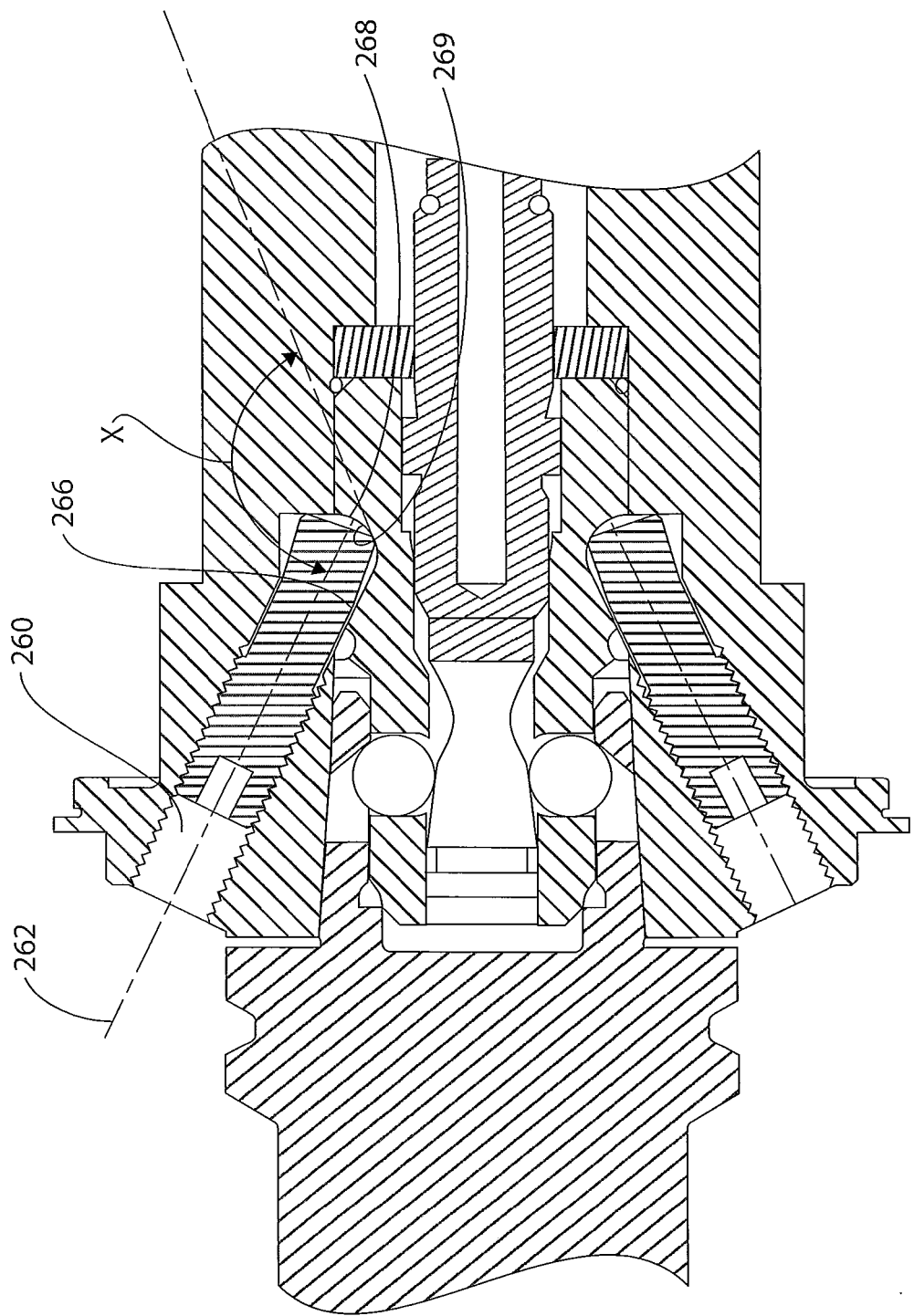
FIG. 5 is a cross-sectional view similar to that illustrated in FIG. 3, however, is modified to show another embodiment of the subject invention.

FIG. 5 illustrates a second embodiment, whereby, unlike FIG. 4, the canister slot deflecting surface 269 extends only partially along the length of the slot 266 and this surface 269 is in the region at the intersection with the locating surface 268. Under these circumstances, the canister slot deflecting surface 269 forms a positive angle X, with respect to the axis 262 of the retention bore 260 of between 135 degrees and 175 degrees and is preferably approximately 160 degrees. It should be appreciated that in FIG. 5 the canister slot deflecting surface 269 is curved and, for that reason, the angle X is measured based upon a tangent from that surface.

Figure 6:
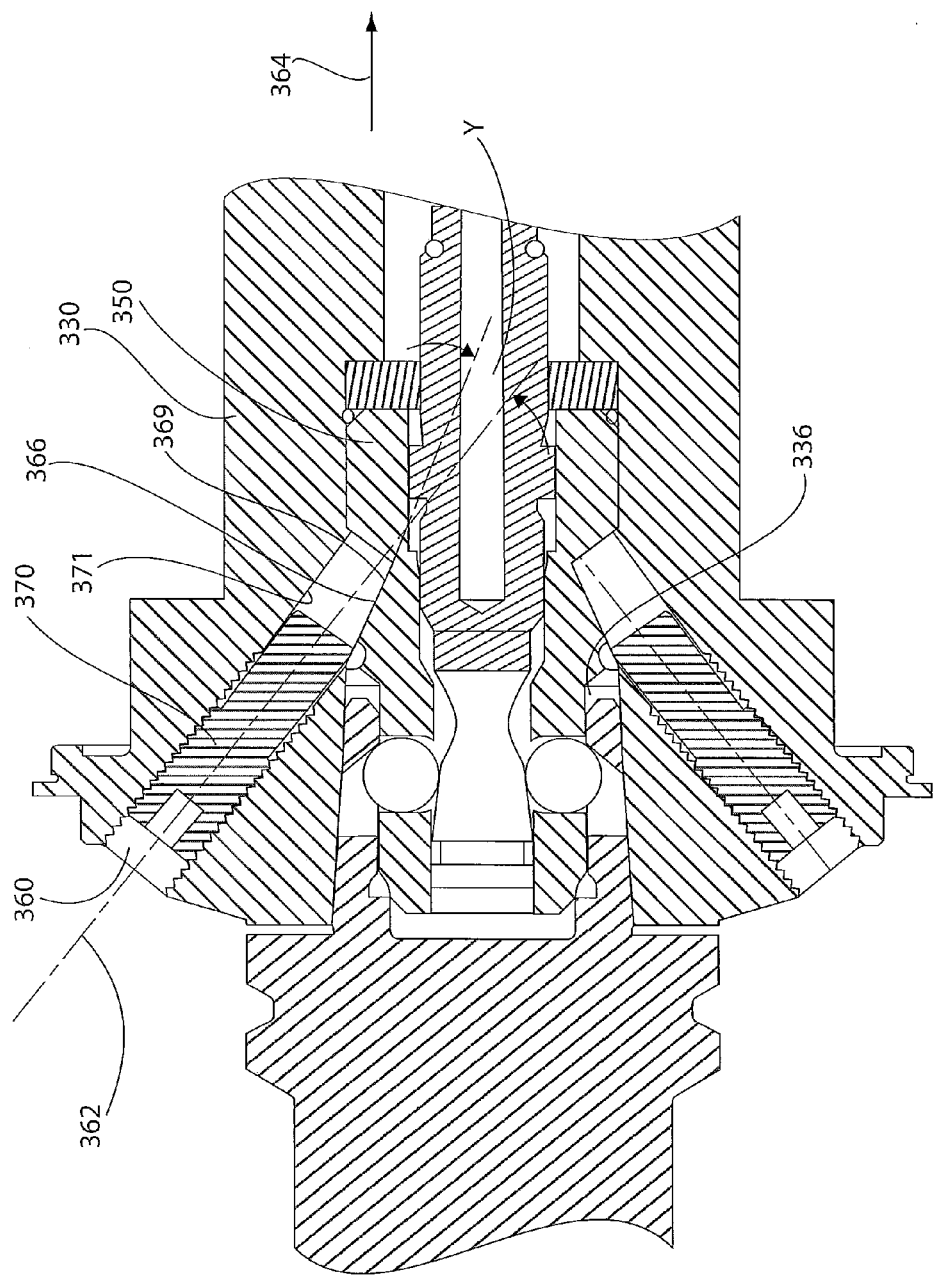
FIG. 6 is a cross-sectional view similar to that illustrated in FIG. 3, however, is modified to show yet another embodiment of the subject invention.

FIG. 6 illustrates yet another embodiment, whereby a retention bore 360 extends through the base member 330 along a retention bore axis 362 having an axial component 364 extending into the base member bore 336. As slot 366 within the canister sleeve 350 has a deflecting surface 369 and together with an opposing portion 371 of the retention bore 360 forms a narrowing taper having an angle Y and extending in a rearward direction. The taper angle Y may be between 1 and 15 degrees and preferably approximately 5 degrees.

A retention bolt 370 is threadably mated with the retention bore 360 to contact the deflecting surface 369 of the canister slot 350 within the base member bore 336. As a result, the retention bolt 370 acts as a wedge to secure the canister sleeve 350 within the base member 330.

Figure 7:
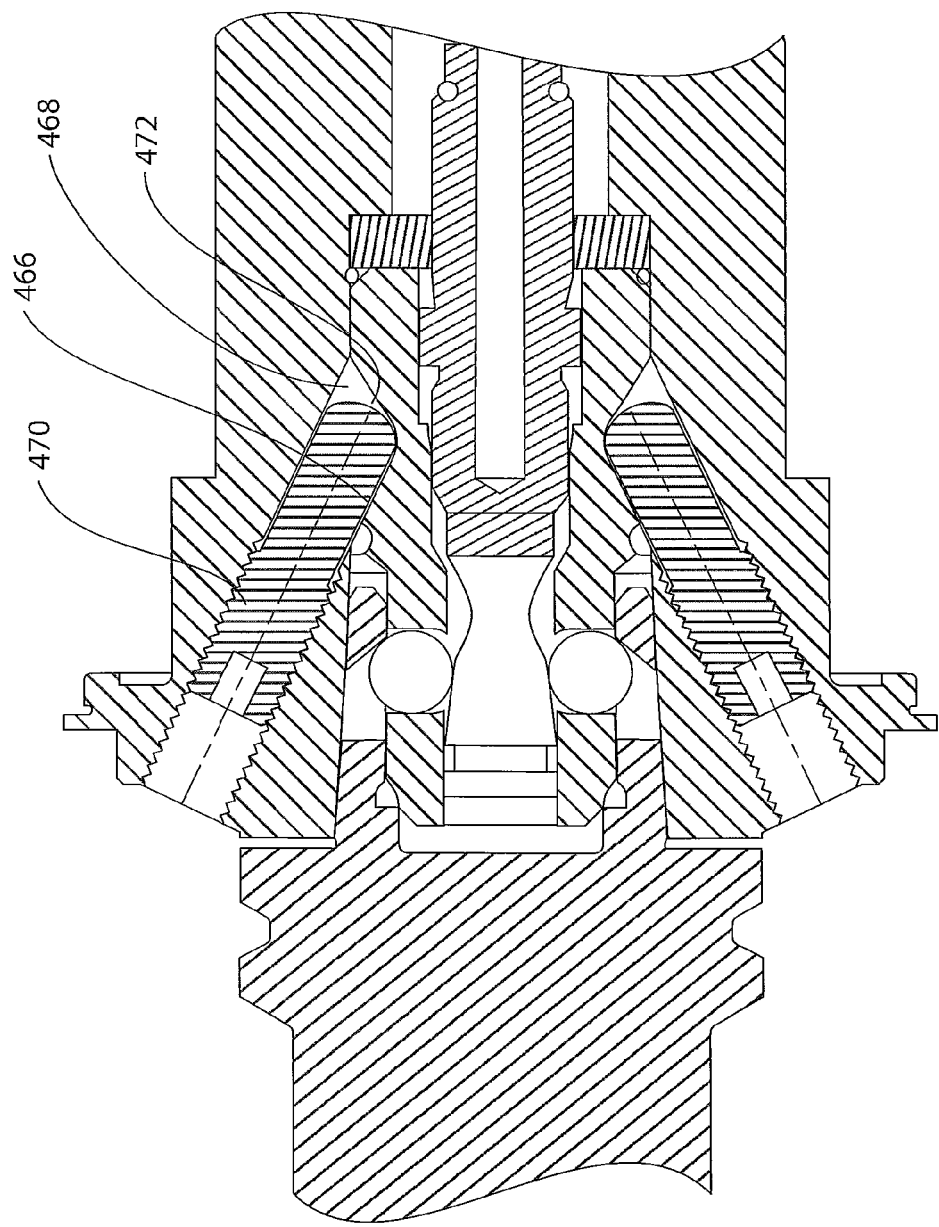
FIG. 7 is a cross-sectional view similar to that illustrated in FIG. 3 illustrating modified retention bolts and a retention bore.

So far discussed, the retention bolt has had a generally flat end which engages the slot surfaces. Direction attention to FIG. 7, the retention bolt 470 has a ball nose end 472. The ball nose end 472 may interact more effectively with the locating surface 468 of the slot 466. It should be noted that the retention bolts previously discussed herein have a radiused side extending into a generally flat end.

As illustrated in FIG. 4, the base member 130 may have at least two diametrically opposed sets of retention bores 160, retention bolts 170, and canister slots 166. It should also be noted that these components may be symmetrically located about the longitudinal axis 132. Such symmetry may also exist in the arrangements illustrated in FIGS. 5 and 6.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A clamping unit for releasably holding a tubular shank of a toolholder, comprising:
   a) a base member with
      1) a longitudinal axis extending therethrough;
      2) a forwardly facing exterior surface; and
      3) a bore extending inwardly from the forwardly facing surface for receiving the toolholder shank;
   b) a lock rod movable within the base member along the longitudinal axis in a forward and rearward reciprocating motion, wherein the lock rod has at least one longitudinally extending depression and an adjacent ramp, such that in the rearward position locking balls are radially displaced by the ramp to engage the toolholder shank within the base member and in the forward position the locking balls retract into the depression and release the shank from the base member;
   c) a canister sleeve mounted within the base member bore with the sleeve outer surface adjacent to the bore wall and the sleeve inner surface surrounding at least a portion of the lock rod, wherein the canister sleeve has radial apertures for guiding the locking balls between the lock rod and the tubular toolholder shank;
   d) a shoulder extending inwardly within the base member bore, wherein the canister sleeve abuts with an intermediate stop ring or directly with the shoulder to limit rearward motion of the canister sleeve;
   e) a retention bore extending through the base member along a retention bore axis having an axial component extending into the base member bore;
   f) a slot within the canister sleeve, wherein the slot has a locating surface generally perpendicular to the retention bore axis and has a deflecting surface, wherein the deflecting surface forms a positive angle X with respect to the retention bore axis; and
   g) a retention bolt threadably mated within the retention bore to contact the canister slot surfaces and clamp the canister sleeve within the base member bore, whereby the retention bolt contacts the locating surface and contacts and is deflected by the deflecting surface in a radial outwardly direction, thereby applying a radially inward and axially rearward force to the canister sleeve.

2. The clamping unit according to claim 1, wherein the canister slot deflecting surface is generally along the length of the slot and forms an angle X of between 150 and 175 degrees.

3. The clamping unit according to claim 2, wherein the angle X is preferably approximately 165 degrees.

4. The clamping unit according to claim 1, wherein the canister slot deflecting surface extends only partially along the length of the slot and is in the region at the intersection with the locating surface.

5. The clamping unit according to claim 1, wherein the canister slot deflecting surface forms an angle X of between 150 and 175 degrees.

6. The clamping unit according to claim 2, wherein the angle X is preferably approximately 165 degrees.

7. A clamping unit for releasably holding a tubular shank of a toolholder, comprising:
   a) a base member with
      1) a longitudinal axis extending therethrough;
      2) a forwardly facing exterior surface; and
      3) a bore extending inwardly from the forwardly facing surface for receiving the toolholder shank;
   b) a lock rod movable within the base member along the longitudinal axis in a forward and rearward reciprocating motion, wherein the lock rod has at least one longitudinally extending depression and an adjacent ramp, such that in the rearward position locking balls are radially displaced by the ramp to engage the toolholder shank within the base member and in the forward position the locking balls retract into the depression and release the shank from the base member;
   c) a canister sleeve mounted within the base member bore with the sleeve outer surface adjacent to the bore wall and the sleeve inner surface surrounding at least a portion of the lock rod, wherein the canister sleeve has radial apertures for guiding the locking balls between the lock rod and the tubular toolholder shank;
   d) a shoulder extending inwardly within the base member bore, wherein the canister sleeve abuts with an intermediate stop ring or directly with the shoulder to limit rearward motion of the canister sleeve;
   e) a retention bore extending through the base member along a retention bore axis having an axial component extending into the base member bore;
   f) a slot within the canister sleeve, wherein the slot has a deflecting surface and together with an opposing portion of the retention bore wall forms a narrowing taper in a rearward direction of an angle Y; and
   g) a retention bolt threadably mated within the retention bore to contact the canister slot deflecting surface within the base member bore, whereby the retention bolt acts as a wedge to secure the canister sleeve within the base member.

8. The clamping unit according to claim 7, wherein the taper angle Y is between 1-15 degrees.

9. The clamping unit according to claim 8, wherein the angle Y is preferably approximately 5 degrees.

10. The clamping unit according to claim 1, wherein the retention bolt has a radiused end.

11. The clamping unit according to claim 1, wherein the retention bolt has a ball nose end.

12. The clamping unit according to claim 1, wherein the base member has at least two diametrically opposed sets of a retention bore, a retention bolt and a canister slot.

13. The clamping unit according to claim 1, wherein the retention bores, retention bolts and canister slots are symmetrically located about the longitudinal axis.

\* \* \* \* \*